(12) United States Patent
Williams et al.

(10) Patent No.: US 10,360,897 B2
(45) Date of Patent: *Jul. 23, 2019

(54) SYSTEM AND METHOD FOR CROWD-SOURCED DATA LABELING

(71) Applicant: AT&T Intellectual Property I, L.P., Atlanta, GA (US)

(72) Inventors: Jason Williams, New York, NY (US); Tirso Alonso, Basking Ridge, NJ (US); Barbara B. Hollister, Mountainside, NJ (US); Ilya Dan Melamed, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,542

(22) Filed: Dec. 9, 2016

(65) Prior Publication Data

US 2017/0092261 A1 Mar. 30, 2017

Related U.S. Application Data

(63) Continuation of application No. 13/300,087, filed on Nov. 18, 2011, now Pat. No. 9,536,517.

(51) Int. Cl.
*G06N 20/00* (2019.01)
*G10L 15/01* (2013.01)
*G10L 15/06* (2013.01)
*G10L 15/26* (2006.01)
*G06F 16/683* (2019.01)

(52) U.S. Cl.
CPC ............ *G10L 15/01* (2013.01); *G06F 16/683* (2019.01); *G06N 20/00* (2019.01); *G10L 15/063* (2013.01); *G10L 15/265* (2013.01); *G10L 15/26* (2013.01); *G10L 2015/0638* (2013.01)

(58) Field of Classification Search
CPC . G10L 15/01; G10L 15/265; G06F 17/30743; G06N 99/005
See application file for complete search history.

(56) References Cited

U.S. PATENT DOCUMENTS

| 4,432,096 A | 2/1984 | Bunge |
| 5,027,408 A | 6/1991 | Kroeker et al. |
| 5,247,580 A | 9/1993 | Kimura |
| 5,754,978 A | 5/1998 | Perez-Mendez et al. |

(Continued)

OTHER PUBLICATIONS

Graepel, Thore, "The Smarter Crowd: Active Learning, Knowledge Corroboration, and Collective IQs," Proceedings of the Fourth ACM International Conference on Web Search and Data Mining, Feb. 9-12, 2011.

(Continued)

*Primary Examiner* — Fariba Sirjani

(57) ABSTRACT

Systems, methods, and computer-readable storage devices for crowd-sourced data labeling. The system requests a respective response from each of a set of entities. The set of entities includes crowd workers. Next, the system incrementally receives a number of responses from the set of entities until one of an accuracy threshold is reached and m responses are received, wherein the accuracy threshold is based on characteristics of the number of responses. Finally, the system generates an output response based on the number of responses.

15 Claims, 4 Drawing Sheets

(56) References Cited

U.S. PATENT DOCUMENTS

| | | | |
|---|---|---|---|
| 6,122,613 | A | 9/2000 | Baker |
| 6,526,380 | B1 | 2/2003 | Thelen et al. |
| 6,618,702 | B1 | 9/2003 | Kohler et al. |
| 6,766,294 | B2 | 7/2004 | MacGinite et al. |
| 6,785,654 | B2 | 8/2004 | Cyr et al. |
| 7,228,275 | B1 | 6/2007 | Endo et al. |
| 7,406,413 | B2 | 7/2008 | Geppert et al. |
| 7,657,433 | B1* | 2/2010 | Chang .................. G10L 15/08 704/236 |
| 7,689,404 | B2 | 3/2010 | Khasin |
| 7,881,928 | B2 | 2/2011 | Gao et al. |
| 7,958,068 | B2 | 6/2011 | Smith et al. |
| 8,014,591 | B2 | 9/2011 | Baker |
| 8,036,890 | B2 | 10/2011 | Catchpole |
| 8,290,206 | B1 | 10/2012 | Meyers |
| 8,321,220 | B1 | 11/2012 | Chotimongkol et al. |
| 8,356,057 | B2 | 1/2013 | Greenshpan |
| 8,364,481 | B2 | 1/2013 | Strope et al. |
| 8,380,506 | B2 | 2/2013 | Jeon et al. |
| 8,484,031 | B1* | 7/2013 | Yeracaris .............. G10L 15/30 704/270.1 |
| 8,527,261 | B2 | 9/2013 | Shibutani |
| 8,554,701 | B1 | 10/2013 | Dillard |
| 8,560,321 | B1 | 10/2013 | Yeracaris |
| 8,626,545 | B2 | 1/2014 | Van Pelt |
| 8,654,933 | B2 | 2/2014 | Doulton |
| 8,676,563 | B2 | 3/2014 | Soricut |
| 8,856,021 | B2 | 10/2014 | Carmel |
| 8,937,620 | B1 | 1/2015 | Teller |
| 8,996,538 | B1 | 3/2015 | Cremer |
| 9,053,182 | B2 | 6/2015 | Agarwal |
| 2003/0115053 | A1 | 6/2003 | Eide et al. |
| 2004/0138885 | A1 | 7/2004 | Lin |
| 2004/0172238 | A1 | 9/2004 | Choo et al. |
| 2004/0210437 | A1 | 10/2004 | Baker |
| 2005/0114357 | A1 | 5/2005 | Chengalvarayan |
| 2007/0055526 | A1 | 3/2007 | Eide et al. |
| 2007/0136059 | A1 | 6/2007 | Gadbois |
| 2007/0136062 | A1 | 6/2007 | Braunschweiler |
| 2007/0198261 | A1 | 8/2007 | Chen |
| 2007/0208570 | A1 | 9/2007 | Bhardwaj |
| 2007/0294076 | A1 | 12/2007 | Shore et al. |
| 2008/0177534 | A1 | 7/2008 | Wang et al. |
| 2008/0201145 | A1 | 8/2008 | Chen et al. |
| 2009/0052636 | A1 | 2/2009 | Webb |
| 2009/0106028 | A1 | 4/2009 | Dhanakshirur et al. |
| 2009/0125370 | A1 | 5/2009 | Blondeau |
| 2009/0157571 | A1 | 6/2009 | Smith |
| 2009/0228478 | A1 | 9/2009 | Steichen |
| 2010/0004930 | A1 | 1/2010 | Strope et al. |
| 2010/0235165 | A1 | 9/2010 | Todhunter et al. |
| 2010/0305945 | A1 | 12/2010 | Krishnaswamy et al. |
| 2010/0312556 | A1* | 12/2010 | Ljolje .................. G10L 15/07 704/244 |
| 2011/0131172 | A1 | 6/2011 | Herzog |
| 2011/0161077 | A1 | 6/2011 | Bielby |
| 2011/0193726 | A1 | 8/2011 | Szwabowski et al. |
| 2011/0208665 | A1 | 8/2011 | Hirsch |
| 2011/0225239 | A1 | 9/2011 | Kansal |
| 2011/0246881 | A1 | 10/2011 | Kushman |
| 2011/0307435 | A1 | 12/2011 | Overell |
| 2011/0313757 | A1 | 12/2011 | Hoover |
| 2011/0313933 | A1 | 12/2011 | Dai |
| 2012/0005222 | A1 | 1/2012 | Bhagwan |
| 2012/0109623 | A1 | 5/2012 | Dolan |
| 2012/0221508 | A1 | 8/2012 | Chaturvedi |
| 2012/0225722 | A1 | 9/2012 | Holder |
| 2012/0316861 | A1 | 12/2012 | Custer |
| 2013/0086072 | A1 | 4/2013 | Peng |
| 2013/0110509 | A1 | 5/2013 | Cath |
| 2013/0124185 | A1 | 5/2013 | Sarr |
| 2013/0132080 | A1 | 5/2013 | Williams et al. |
| 2013/0204652 | A1 | 8/2013 | Marins |
| 2015/0106085 | A1 | 4/2015 | Lindahl |

OTHER PUBLICATIONS

Ipeirotis, Panos, "Crowdsourcing using Mechanical Turk: Quality Management and Scalability", Proceedings of the Fourth ACM International Conference on Web Search and Data Mining, Feb. 9-12, 2011.

Eickhoff, Carsten et al., "How Crowdsourcable is Your Task?" Proceedings of the Fourth ACM International Conference on Web Search and Data Mining, Feb. 9-12, 2011.

Mason, Winter, "Individual vs. Group Success in Social Networks", Proceedings of the Fourth ACM International Conference on Web Search and Data Mining, Feb. 9-12, 2011.

Kumar, Abhimanu et al., "Modeling Annotator Accuracies for Supervised Learning", Proceedings of the Fourth ACM International Conference on Web Search and Data Mining, Feb. 9-12, 2011.

McCreadie, Richard et al., "Crowdsourcing Blog Track Top News Judgments at TREC", Proceedings of the Fourth ACM International Conference on Web Search and Data Mining, Feb. 9-12, 2011.

Vliegendhart, Raynor et al., "Investigating Factors Influencing Crowdsourcing tasks with High Imaginative Load.", Proceedings of the Fourth ACM International Conference on Web Search and Data Mining, Feb. 9-12, 2011.

Wang, Jing et al., "Estimating the Completion Time of Crowdsourced Tasks Using Survival Analysis Models", Proceedings of the Fourth ACM International Conference on Web Search and Data Mining, Feb. 9-12, 2011.

Zuccon, et al., "Crowdsourcing Interactions; A Proposal for capturing user interactions through crowdsourcing," Proceedings of the Fourth ACM International Conference on Web Search and Data Mining, Feb. 9-12, 2011.

Alonso, Omar, "Perspectives on Infrastructure for Crowdsourcing", Proceedings of the Fourth ACM International Conference on Web Search and Data Mining, Feb. 9-12, 2011.

Harris, Christopher G., "You're Hired! An Examination of Crowdsourcing Incentive Models in Human Resource Tasks", Proceedings of the Fourth ACM International Conference on Web Search and Data Mining, Feb. 9-12, 2011.

Wald, Mike, "Crowdsourcing correction of speech recognition captioning errors." (2011).

Parent, Gabriel et al., "Speaking to the Crowd: Looking at Past Achievements in Using Crowdsourcing for Speech and Predicting Future Challenges", Interpseech, 2011.

Novotney, S. et al., Cheap, fast and good enough: Automatic speech recognition with non-expert transcription. In Human Language Technologies: The 2010 Annual Conference of the North American Chapter of the Association for Computational Linguistics (pp. 207-215). Association for Computational Linguistics. Jun. 2010.

Williams, Jason et al., "Crowd-sourcing for difficult transcription of speech," Automatic Speech Recognition and Understanding (ASRU), 2011 IEEE Workshop on IEEE, 2011.

* cited by examiner

SYSTEM AND METHOD FOR CROWD-SOURCED DATA LABELING

PRIORITY INFORMATION

The present application is a continuation of U.S. patent application Ser. No. 13/300,087, filed Nov. 18, 2011, the contents of which are incorporated herein by reference in their entirety.

BACKGROUND

1. Technical Field

The present disclosure relates to data labeling and more specifically to crowd-sourced data labeling.

2. Introduction

Labeled data is vital for training statistical models. For instance, labeled data is used to train automatic speech recognition engines, text-to-speech engines, machine translation systems, internet search engines, video analysis algorithms, and so forth. In all these applications, increasing the amount of labeled data generally yields better performance. Thus, gathering large amounts of labeled data is extremely important to advancing performance in a wide range of technologies.

Traditional approaches to labeling data rely on hiring and training experts. Here, each data instance is examined and labeled by an expert. Sometimes, each data instance is also checked by another expert. Disadvantageously, the traditional process of labeling data with experts is expensive and slow: hiring and training experts can be very costly, and experts require many hours of work to label even a comparatively small number of instances. This approach is also impractical and inefficient. For example, it is impractical to swiftly add and discharge experts, and difficult to label a burst of data rapidly. Moreover, it is often hard to find enough experts for large labeling projects, particularly when the volume of work fluctuates.

Recently, crowd-sourcing has emerged as a faster and cheaper approach to labeling data, enabled by platforms such as Amazon's Mechanical Turk. In crowd-sourcing, a large task is divided into smaller tasks. The smaller tasks are then distributed to a large pool of crowd workers, typically through a website. The crowd workers complete the smaller tasks for very small payments, resulting in substantially lower overall costs. Further, the crowd workers work concurrently, greatly speeding up the completion of the original large task.

Despite the speed improvements and lower costs, crowd-sourcing is limited in several ways. For example, individual crowd workers are often inaccurate and generally produce lower quality labels. Requesting a greater, fixed number of labels can improve overall accuracy, but in practice, many of these are not needed, resulting in wasted expense. Automatic labelers are sometimes combined with crowd-sourcing to increase accuracy. However, current implementations are open to cheating by crowd workers, as the output from the automatic labelers is given to the crowd workers as a suggested label, and the workers have an obvious incentive to make as few edits as possible, as they are paid by the task. These and other challenges remain as significant obstacles to improving a wide range of technologies that rely on labeled data.

SUMMARY

The approaches set forth herein can be used to efficiently and inexpensively label data by crowd-sourcing. Here, crowd workers are used to reduce the cost of data labeling. Each instance can be examined by several crowd workers to ensure high overall accuracy, and the crowd workers can work concurrently to maximize speed. The responses can be analyzed to determine the number of data labels that should be requested to obtain a desired degree of accuracy. This greatly reduces unnecessary data labeling requests while achieving high overall accuracy: wasteful data labeling requests can be trimmed without compromising overall accuracy. In addition, an automatic labeler can be implemented in a way that makes cheating by the crowd workers impossible, further increasing accuracy while reducing the number of labels requested.

Disclosed are systems, methods, and non-transitory computer-readable storage media for crowd-sourced data labeling. The method is discussed in terms of a system configured to practice the method. The system requests a respective response from each of a set of entities. The set of entities can include at least one of a crowd worker, an expert, an automatic labeler, and so forth. The respective response—called a label—can include one or more of a translation, rating, recognition candidate, transcription, comment, text, and so forth. Further, the respective response can be associated with a human intelligence task, such as transcription of spoken words, for example.

The system then incrementally receives a number of responses from the set of entities until at least one of an accuracy threshold is reached and m responses are received, wherein the accuracy threshold is based on characteristics of the number of responses. The characteristics of the number of responses can include a size, content, label, duration, time of day, location, identity, confidence score, difficulty, diversity, etc. The accuracy threshold can be determined, for example, using a regression model. In one embodiment, the accuracy threshold is determined by comparing the number of responses.

Finally, the system generates an output response based on the number of responses. The output response—called a label—can include one or more of a translation, rating, recognition candidate, transcription, comment, text, and so forth. In one embodiment, the output response is the most common response from the number of responses. In another embodiment, the output response is a response from the number of responses having the highest probability of correctness.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with

Figure 1:
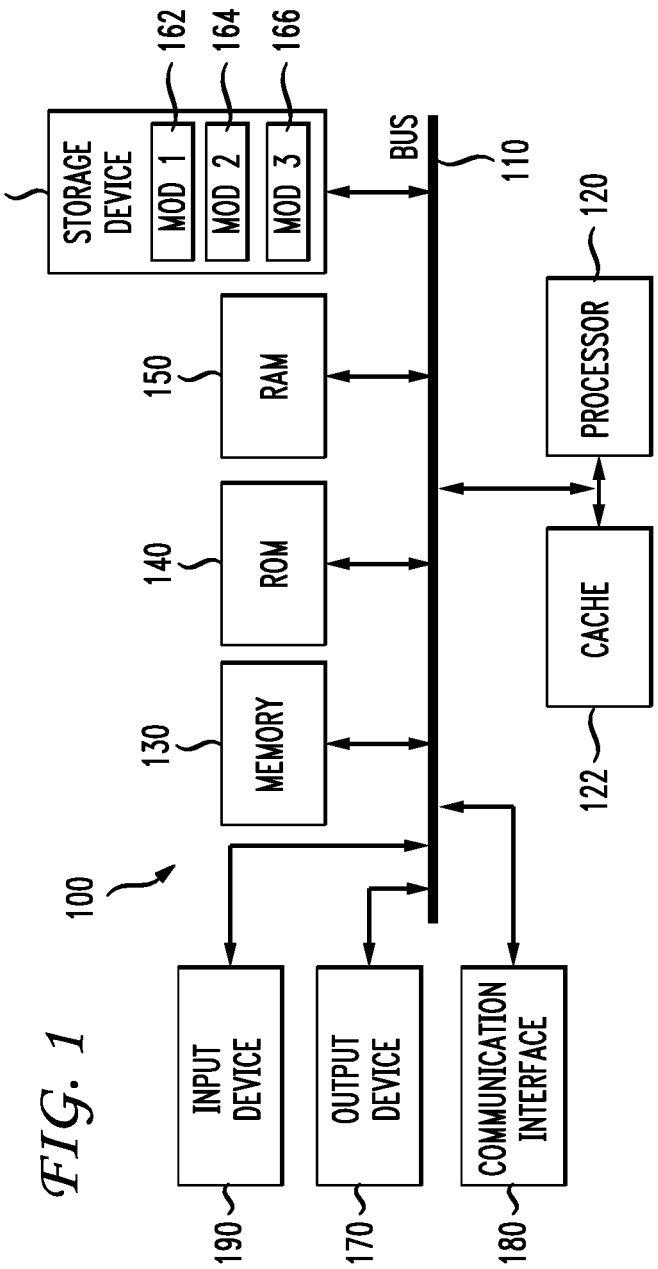
Figure 2:
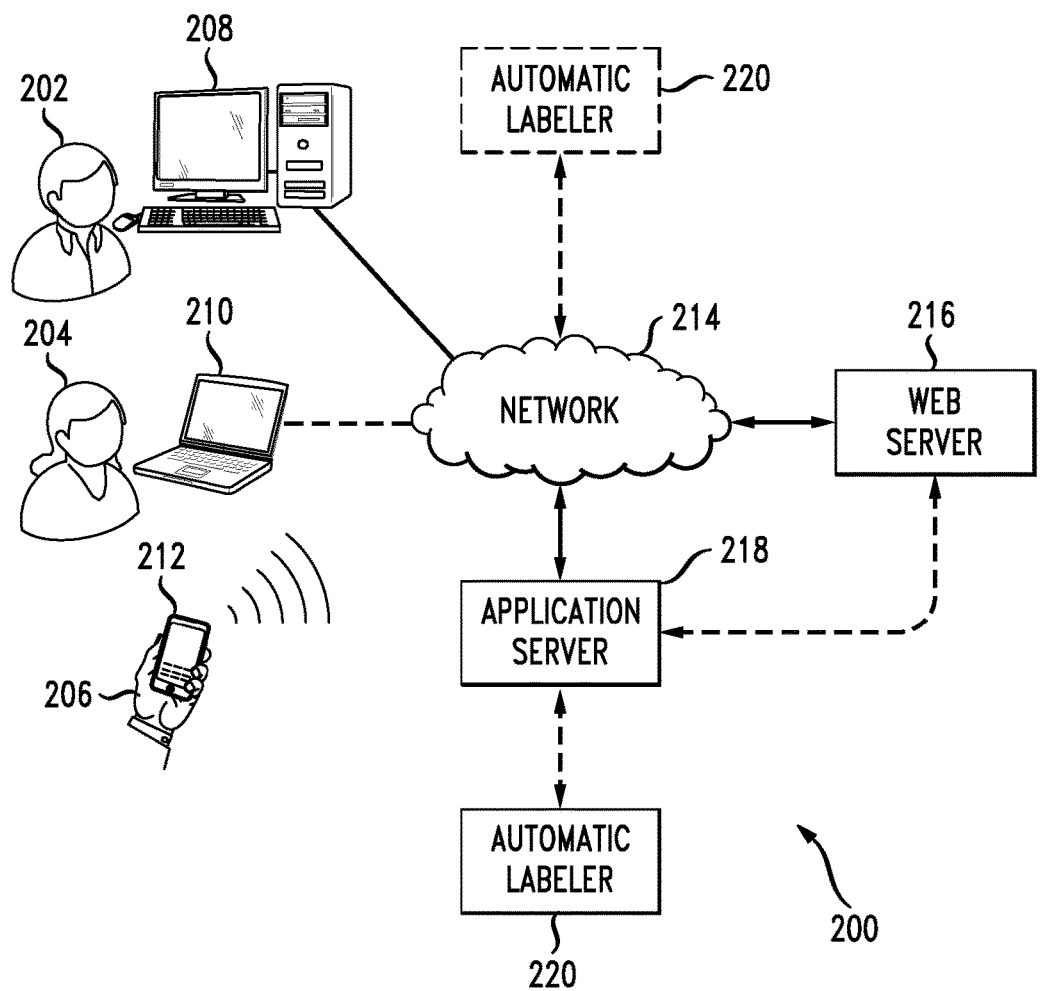
Figure 3:
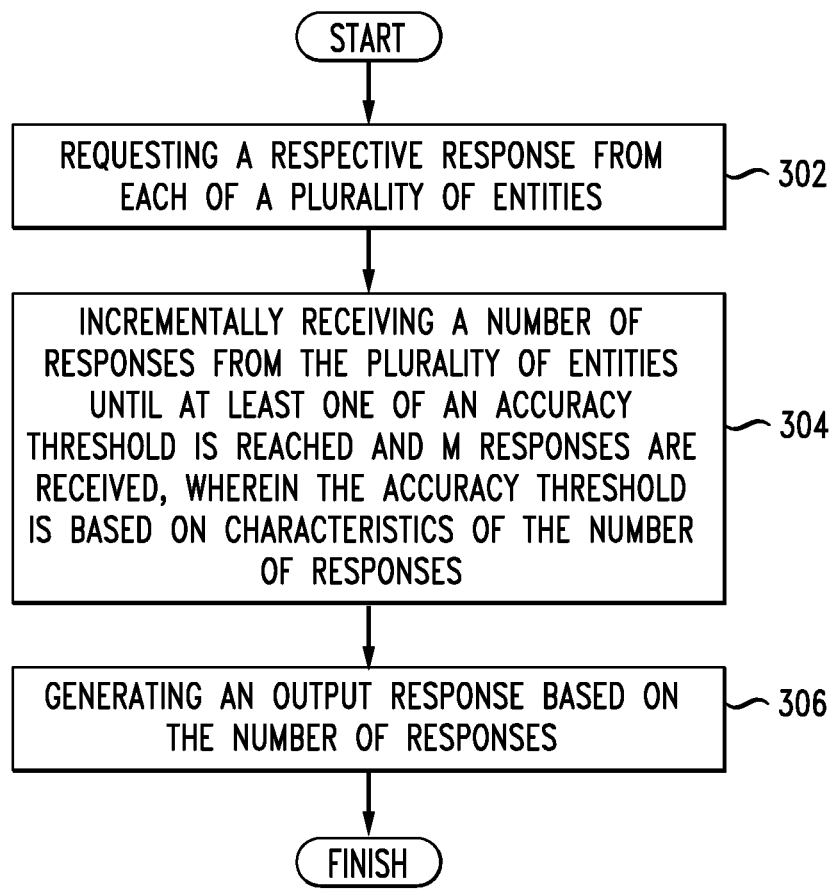

3 additional specificity and detail through the use of the accompanying drawings in which:

FIG. 1 illustrates an example system embodiment;

FIG. 2 illustrates an exemplary architecture for performing crowd-sourced data labeling;

FIG. 3 illustrates an example method embodiment; and

Figure 4:
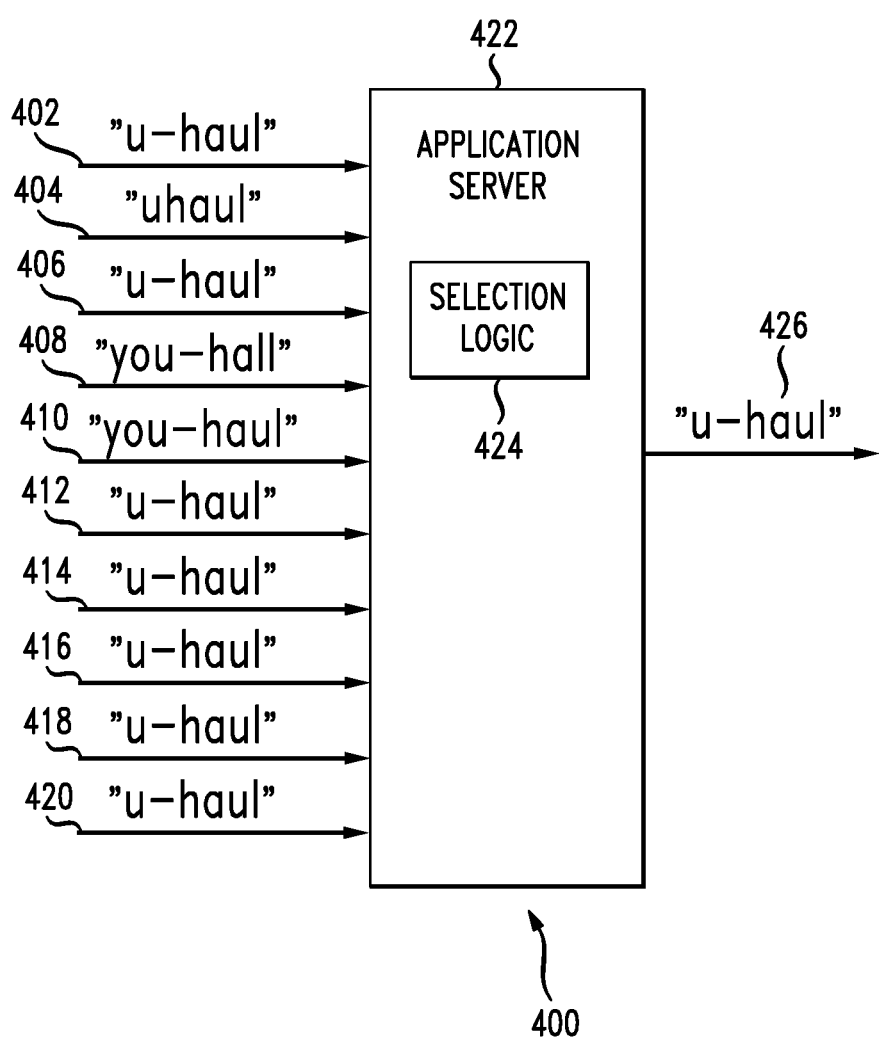

FIG. 4 illustrates an application server generating an example output response based on multiple sample responses.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for efficiently and inexpensively labeling data. A system, method and non-transitory computer-readable media are disclosed which perform crowd-sourced data labeling. A brief introductory description of a basic general purpose system or computing device in FIG. 1, which can be employed to practice the concepts, is disclosed herein. The disclosure then turns to a description of speech processing and related approaches. A more detailed description of the principles, architectures, and methods will then follow. These variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to FIG. 2, which illustrates an exemplary architecture 200 for performing crowd-sourced data labeling. The architecture 200 illustrated in FIG. 2 includes client devices 208, 210, and 212, a web server 216, and an application server 218. In one embodiment, the architecture also includes an automatic labeler 220.

The client devices 208, 210, and 212 can be any device with networking capabilities, such as a mobile phone, a computer, a portable player, a television, a video game console, etc. The client devices 208, 210, and 212 can communicate with the web server 216 and the application server 218 over a network 214. Moreover, the client devices 208, 210, and 212 can connect to the network 214 via a wired or wireless connection. For example, the client devices 208, 210, and 212 can be configured to use an antenna, a modem, or a network interface card to connect to the network 214 via a wireless or wired network connection. The network 214 can be a public network, such as the Internet, but can also include a private or quasi-private network, such as a local area network, an internal corporate network, a virtual private network (VPN), and so forth.

The crowd workers 202, 204, and 206 can communicate with the web server 216 via client devices 208, 210, and 212. For example, the crowd workers 202, 204, and 206 can use a software application on the client devices 208, 210, and 212, such as a web browser or smartphone app, to access content on the web server 216 or other server. The client devices 208, 210, and 212 and the web server 216 can use one or more exemplary protocols to communicate, such as TCP/IP, RTP, ICMP, SSH, TLS/SSL, SIP, PPP, SOAP, FTP, SMTP, HTTP, XML, and so forth. Other communication and/or transmission protocols yet to be developed can also be used.

The web server 216 can include one or more servers configured to deliver dynamic and/or static content through the network 214. In one embodiment, the web server 216 is configured to deliver a web page containing a list of human intelligence tasks. Here, the crowd workers 202, 204, and 206 can access the web page on the web server 216 from a web browser on the client devices 208, 210, and 212. In another embodiment, the web server 216 is configured to support web-based crowd-sourcing. In this instance, the web server 216 can source tasks, which the crowd workers 202, 204, and 206 can access using a client application on the client devices 208, 210, and 212. In yet another embodiment, the web server 216 is configured to support a collaborative workspace.

The web server 216 can communicate with the application server 218 via a data cable, a processor, an operating system, and/or network 214. The application server 218 is configured to receive data, such as data labels, and generate an output based on the data. In one embodiment, the application server 218 is an application hosted on the web server 216. In another embodiment, the application server 218 is an application hosted on one or more separate servers. In yet another embodiment, the application server 218 is an automatic speech recognition system.

In one embodiment, an automatic labeler 220 is implemented to provide a recognition candidate, such as an automatic speech recognition (ASR) output, which the application server 218 can use in generating its output. The automatic labeler 220 can be an application—such as, for example, a machine learning application—hosted on the application server 218, an application hosted on one or more separate servers, a natural language spoken dialog system, a recognition engine, a statistical model, an ASR module, etc. Further, the automatic labeler 220 can communicate with the application server 218 via a data cable, a processor, an operating system, and/or network 214. Similarly, the automatic labeler 220 can be configured to communicate with the web server 216 via a data cable, a processor, an operating system, and/or network 214.

In one embodiment, the crowd workers 202, 204, and 206 access a task on the web server 216 via client devices 208, 210, and 212, and send respective responses to the web server 216. The web server 216 subsequently sends the respective responses to the application server 218, which generates an output based on the respective responses. In another embodiment, the crowd workers 202, 204, and 206 access a task on the web server 216 via client devices 208, 210, and 212, and send respective responses to the application server 218. The application server 218 then generates an output based on the respective responses. In yet another embodiment, the crowd workers 202, 204, and 206 access a task on the web server 216 via client devices 208, 210, and 212, and store respective responses on a storage device, which the web server 216 and/or the application server 218 can access through the network 214.

It is clearly understood by one of ordinary skill in the art that although FIG. 2 illustrates three crowd workers and three client devices, other embodiments can include a different number of crowd workers and/or client devices. Similarly, it is clearly understood by one of ordinary skill in the art that although FIG. 2 illustrates one application server and one web server, other embodiments can include multiple application servers and/or multiple web servers. Indeed, the application server and/or the web server can include a server cluster, for example. The crowd workers can work in parallel at the same time or at different times.

Having discussed some basic system components and concepts, the disclosure now turns to the exemplary method embodiment shown in FIG. 3. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 requests a respective response from each of a set of entities (302). The set of entities includes crowd workers, which can be, for example, a group of workers of various skills. In one embodiment, the set of entities includes a group of crowd workers and an automatic labeler. In this example, the automatic labeler can generate an ASR output (a respective response), which can then be used by the system 100 in step 304 and/or step 306 discussed below. In another embodiment, the set of entities includes a group of crowd workers, an expert, and an automatic labeler.

The respective response—called a label—can include one or more of a translation, a rating, a value, a recognition candidate, a transcription, a category, a comment, a text, and so forth. For example, the respective response can be an internet search quality rating, a language translation, an identification of an object in an image, a recognized name of a character in a movie scene, a part-of-speech tag, etc. In one embodiment, the respective response is a transcription of spoken words. For instance, the system 100 can provide an utterance to be transcribed and request a respective transcription from a group of crowd workers. Here, each respective response can consist of a respective transcription of the utterance. In another embodiment, the respective response is a completed task, such as a human intelligence task. For instance, the respective response can be a description of a video. In yet another embodiment, the respective response can be an ASR output. For example, the respective response can be an output generated by an automatic labeler.

Next, the system 100 incrementally receives a number of responses from the set of entities until at least one of an accuracy threshold is reached and m responses are received, wherein the accuracy threshold is based on characteristics of the number of responses (304). In one embodiment, the system 100 first receives an ASR output and then incrementally receives zero or more respective responses from a group of crowd workers until an accuracy threshold is reached or m responses are received. The characteristics of the number of responses can include a size, a label, an attribute, a duration, a time of day, a location of the set of entities, an identity of the set of workers, a confidence score, a difficulty, a diversity, and/or content. In one embodiment, the characteristics of the number of responses include a difficulty associated with the transcription of an utterance. In another embodiment, the characteristics of the number of responses include the number of times that an utterance was provided for transcription. In yet another embodiment, the characteristics of the number of responses include content of an internet search result.

The characteristics of the number of responses can provide various clues about the accuracy of a respective response and is therefore relevant in determining the accuracy threshold. For example, the characteristics of the number of responses can be a number of times a crowd worker listens to an utterance in transcribing the utterance. Here, the number of times the crowd worker listens to the utterance can suggest the crowd worker had difficulty in transcribing the utterance, which can indicate that the transcription is less likely to be correct. The number of times the crowd worker listens to the utterance can also provide a clue about the accuracy of the response vis-à-vis other responses.

As another example, the characteristics of the number of responses can be a specific label (e.g., is empty) and/or an attribute of the content associated with an audio sample (e.g., empty audio). Since empty audio is generally easier to identify, an empty audio sample and/or a label identifying an empty audio sample can be relevant clues considered in assessing whether an accuracy threshold has been reached.

As yet another example, the characteristics of the number of responses can be a comment from a crowd worker. To illustrate, the comment can be, for example, an indication from a crowd worker that an utterance was hard to understand. Here, the comment can provide a clue about the accuracy of the response from the crowd worker.

In one embodiment, the accuracy threshold is a number of agreeing responses. In this case, the accuracy threshold can be determined by comparing the number of responses to determine the number of matching responses. For example, the accuracy threshold can be reached when the system 100 receives n matching responses, which the system 100 can determine by comparing the responses received. This way, the system 100 does not request/receive unnecessary responses, as the system 100 only receives the responses necessary to attain a desired degree of accuracy. And depending on the desired degree of accuracy, the accuracy threshold can be increased or decreased accordingly. Further, m can serve as a further limit: if the accuracy threshold has not been reached after m responses, the system 100 can stop receiving responses. This additional limit can serve as another safeguard against unnecessary waste. To this end, m can be set, for example, to a number that corresponds to a point of increasing relative cost—or decreasing relative value—where further responses are deemed scarcely beneficial.

In another embodiment, the accuracy threshold is a probability of correctness. For example, the accuracy threshold can be a 90% probability of correctness. Here, the system 100 can incrementally receive a number of responses until a 90% probability of correctness is reached, or the system 100 receives m responses. The probability of correctness can be determined using a statistical model, for example. In one embodiment, the probability of correctness is determined using a regression model. The regression model can use the characteristics of the number of responses, among other things, to predict the accuracy of the responses.

Finally, the system 100 generates an output response based on the number of responses (306). The output response can then be used, for example, to train automatic speech recognition engines, text-to-speech engines, gesture recognition engines, machine translation systems, internet search engines, video analysis algorithms, and so forth. Moreover, the output response—the label—can include zero or more of a value, a transcription, a selection, a rating, a recognition candidate, a translation, a tag, a name, a description, etc. In one embodiment, the output response is the most common response from the number of responses. In another embodiment, the output response is the response from the number of responses with the highest probability of correctness. In yet another embodiment, the output response is a combination of responses from the number of responses. In still another embodiment, the output response is a response from the number of responses having a highest number of votes.

The disclosure now turns to FIG. 4, which illustrates an application server generating an example output response based on multiple sample responses 400. The respective responses 402-420 are various transcriptions of an utterance of the word "u-haul" from various crowd workers, which can be a collection of human and automated entities. In addition to the transcriptions, each respective response 402-420 also includes a plurality of associated characteristics, such as the time of day, a worker identifier, the number of times the worker listened to the audio file, and so on. The responses 402-420 can be received at the same time, within a specified time frame (such as within a 24-hour window), or at any time as workers take up the work and complete it on their own schedules. As shown in FIG. 4, the respective responses 402-420 reflect various degrees of lexical and phonetic accuracy. Here, responses 404, 408, and 410 do not match any others of the respective responses 402-420. By contrast, the most frequent response, "u-haul," is repeated in 7 responses—respective responses 402 and 412-420. This pattern suggests that "u-haul" is the correct transcription, as is the case in this example.

The application server 422 is configured to incrementally receive respective responses until it receives at least 7 matching responses or a maximum of 20 responses. Thus, the application server 422 incrementally receives respective responses 402-418, and stops after receiving the seventh matching response, respective response 420. The application server 422 then generates an output response 426 by selecting the most frequent response, "u-haul," provided in respective responses 402 and 412-420. The application server 422 uses selection logic 424 to determine if 7 matching responses—the accuracy threshold—have been received and select the most common response once the accuracy threshold has been reached. The selection logic 424 can include a software program, a module, a procedure, a function, a regression model, an algorithm, etc. In one embodiment, the selection logic 424 is an application. In another embodiment, the selection logic 424 is a recognition engine. In yet another embodiment, the selection logic 424 is a search engine. In still another embodiment, the selection logic 424 is a classifier.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any crowd-sourcing task in any situation. Those skilled in the art will readily recognize various modifications and changes that may be made to the principles described herein without following the example embodiments and applications illustrated and described herein, and without departing from the spirit and scope of the disclosure.

We claim:

1. A method comprising:
   requesting a respective transcription associated with input speech from each of a plurality of second computing devices being networked with a first computing device that received the input speech, the plurality of second computing devices comprising a plurality of client devices, wherein the respective transcription of the input speech is generated by a respective human crowd worker operating on a respective client device of the plurality of client devices and without reference to any automated transcription of the input speech by an automatic speech recognition engine;
   receiving, for the respective transcription, a number of times the respective human crowd worker who generated the respective transcription listened to the input speech to provide the respective transcription;
   calculating an accuracy threshold for the respective transcription, wherein the accuracy threshold is based on the number of times the respective human crowd worker listened to the input speech to generate the respective transcription;
   after generating the respective transcription from the respective human crowd worker, receiving an automatic speech recognition transcription, by the automatic speech recognition engine, of the input speech;
   determining a number of matches that exist between the respective transcription and the automatic speech recognition transcription to yield a determination;
   when the determination meets a match threshold, generating, based on the respective transcription and the automatic speech recognition transcription, an output response to the input speech and training the automatic speech recognition engine using the output response; and
   when the determination indicates that the match threshold has not been met between the respective transcription and the automatic speech recognition transcription:

determining a maximum number of transcriptions to receive from the plurality of second computing devices and the automatic speech recognition engine;
incrementally receiving additional transcriptions from the plurality of second computing devices until one of the match threshold is reached or the maximum number of transcriptions is received;
when the match threshold is reached or the maximum number of transcriptions is received, generating, based at least in part on the additional transcriptions, a second output response to the input speech; and
training the automatic speech recognition engine using the second output response.

2. The method of claim 1, wherein the match threshold further requires a predetermined number of matching responses.

3. The method of claim 2, wherein the match threshold is further based on a time of day when the transcription is received.

4. The method of claim 1, wherein two of the transcriptions are automatic speech recognition output.

5. The method of claim 1, wherein the match threshold is further based on one of a content, a size, a label, a duration, a location of the respective human crowd worker, an identity of the respective human crowd worker, an attribute, a confidence score, a difficulty, and a diversity.

6. The method of claim 1, wherein the match threshold is further based on a probability of correctness.

7. The method of claim 1, wherein the match threshold comprises n matching responses, and wherein n is one of less than the maximum number of responses and equal to the maximum number of responses.

8. A system comprising:
a processor configured to perform automatic speech recognition; and
a computer-readable storage device having instructions stored which, when executed by the processor, cause the processor to perform operations comprising:
requesting a respective transcription associated with input speech from each of a plurality of second computing devices being networked with a first computing device that received the input speech, the plurality of second computing devices comprising a plurality of client devices, wherein the respective transcription of the input speech is generated by a respective human crowd worker operating on a respective client device of the plurality of client devices and without reference to any automated transcription of the input speech by an automatic speech recognition engine;
receiving, for the respective transcription, a number of times the respective human crowd worker who generated the respective transcription listened to the input speech to provide the respective transcription;
calculating an accuracy threshold for the respective transcription, wherein the accuracy threshold is based on the number of times the respective human crowd worker listened to the input speech to generate the respective transcription;
after generating the respective transcription from the respective human crowd worker, receiving an automatic speech recognition transcription, by the automatic speech recognition engine, of the input speech;
determining a number of matches that exist between the respective transcription and the automatic speech recognition transcription to yield a determination;
when the determination meets a match threshold, generating, based on the respective transcription and the automatic speech recognition transcription, an output response to the input speech and training the automatic speech recognition engine using the output response; and
when the determination indicates that the match threshold has not been met between the respective transcription and the automatic speech recognition transcription:
determining a maximum number of transcriptions to receive from the plurality of second computing devices and the automatic speech recognition engine;
incrementally receiving additional transcriptions from the plurality of second computing devices until one of the match threshold is reached or the maximum number of transcriptions is received;
when the match threshold is reached or the maximum number of transcriptions is received, generating, based at least in part on the additional transcriptions, a second output response to the input speech and training the automatic speech recognition engine using the second output response.

9. The system of claim 8, wherein the accuracy threshold further requires a predetermined number of matching responses.

10. The system of claim 9, wherein the accuracy threshold is further based on a time of day when the transcription is received.

11. The system of claim 8, wherein two of the transcription are automatic speech recognition output.

12. The system of claim 8, wherein the accuracy threshold is further based on one of a content, a size, a label, a duration, a location of the respective human crowd worker, an identity of the respective human crowd worker, an attribute, a confidence score, a difficulty, and a diversity.

13. The system of claim 8, wherein the accuracy threshold is further based on a probability of correctness.

14. The system of claim 8, wherein the accuracy threshold comprises n matching responses, and wherein n is one of less than the maximum number of responses and equal to the maximum number of responses.

15. A computer-readable storage device having instructions stored which, when executed by a computing device configured to perform automatic speech recognition, cause the computing device to perform operations comprising:
requesting a respective transcription associated with input speech from each of a plurality of second computing devices being networked with a first computing device that received the input speech, the plurality of second computing devices comprising a plurality of client devices, wherein the respective transcription of the input speech is generated by a respective human crowd worker operating on a respective client device of the plurality of client devices and without reference to any automated transcription of the input speech by an automatic speech recognition engine;
receiving, for the respective transcription, a number of times the respective human crowd worker who generated the respective transcription listened to the input speech to provide the respective transcription;
calculating an accuracy threshold for the respective transcription, wherein the accuracy threshold is based on the number of times the respective human crowd worker listened to the input speech to generate the respective transcription;

after generating the respective transcription from the respective human crowd worker, receiving an automatic speech recognition transcription, by the automatic speech recognition engine, of the input speech;

determining a number of matches that exist between the respective transcription and the automatic speech recognition transcription to yield a determination;

when the determination meets a match threshold, generating, based on the respective transcription and the automatic speech recognition transcription, an output response to the input speech and training the automatic speech recognition engine using the output response; and when the determination indicates that the match threshold has not been met between the respective transcription and the automatic speech recognition transcription:

determining a maximum number of transcriptions to receive from the plurality of second computing devices and the automatic speech recognition engine;

incrementally receiving additional transcriptions from the plurality of second computing devices until one of the match threshold is reached or the maximum number of transcriptions is received;

when the match threshold is reached or the maximum number of transcriptions is received, generating, based at least in part on the additional transcriptions, a second output response to the input speech and training the automatic speech recognition engine using the second output response.

* * * * *